US00RE35983E

United States Patent [19]

Crowley

[11] E Patent Number: Re. 35,983

[45] Reissued Date of Patent: Dec. 8, 1998

[54] LIGHT FIXTURE MOUNTING PEDESTAL

[76] Inventor: Charles H. Crowley, 1330 Tracilee, Howell, Mich. 48843

[21] Appl. No.: 338,259

[22] Filed: Nov. 14, 1994

Related U.S. Patent Documents

Reissue of:

[64] Patent No.: 4,635,168
Issued: Jan. 6, 1987
Appl. No.: 745,543
Filed: Jun. 17, 1985

[51] Int. Cl.[6] ..... F21S 1/02

[52] U.S. Cl. ..... 362/147; 362/147; 362/370; 362/432; 174/48; 220/3.8; 220/18; 220/242

[58] Field of Search ..... 362/147, 368, 362/370, 382, 432, 433; 220/3.8, 18, 241, 242; 174/48; 52/28

[56] References Cited

U.S. PATENT DOCUMENTS

| | | | |
|---|---|---|---|
| 2,456,792 | 12/1948 | Ohm | 362/432 |
| 4,156,272 | 5/1979 | Wandler | 362/147 |
| 4,229,916 | 10/1980 | White | 52/98 |
| 4,245,284 | 1/1981 | Moore et al. | 362/370 |
| 4,309,744 | 1/1982 | Catanese | 362/147 |
| 4,327,841 | 5/1982 | Wimberly | 220/38 |
| 4,341,919 | 7/1982 | Kohaut | 174/48 |
| 4,472,768 | 9/1984 | Quiogue | 362/432 |

*Primary Examiner*—Ira S. Lazarus
*Assistant Examiner*—Y. Quach
*Attorney, Agent, or Firm*—Young & Basile, P.C.

[57] ABSTRACT

A coach lamp or other exterior lamp or ornament is mounted on the exterior surface of a building having horizontal aluminum siding by means of a pedestal having a faceplate portion and a continuous peripheral skirt which is deeper than the steps in the siding. The pedestal is secured to a conventional electrical outlet box and the faceplate portion provides a flush mounting surface for the base of the lamp or ornament.

13 Claims, 1 Drawing Sheet

LIGHT FIXTURE MOUNTING PEDESTAL

Matter enclosed in heavy brackets [ ] appears in the original patent but forms no part of this reissue specification; matter printed in italics indicates the additions made by reissue.

DESCRIPTION

1. Introduction

This invention relates to the mounting of exterior lamps and ornaments on the surface of a building which is finished in metal or wood siding or shingles or the like. More specifically, the invention resides in a lamp-mounting pedestal and in a method of installing lamps and ornaments on exterior siding.

2. Background Of The Invention

For several decades it has been popular to finish the exterior of a building in siding which may be made of aluminum or wood and which is arranged in a overlapped or lap-straked configuration; i.e., a configuration consisting of strake surfaces interrupted by steps. Although the steps may be fairly shallow; i.e., on the order of one-half inch, and the strake surfaces maybe fairly borad, it is difficult or impossible to satisfactorily mount an exterior lamp or ornament on such a surface because the base or bezel of the lamp or ornament is intended for flush contact with a flat and vertical surface.

The problem can be approached in various ways; for example, the installer may simply cut a very large hole in the siding and place some kind of an adapter within the hole, or he may simply mount the lamp in a non-vertical and awkward looking position. No known solution to the problem is satisfactory.

3. Brief Description Of The Invention

In accordance with the invention means are provided for establishing a flat mounting surface for an exterior lamp or ornament or the like on a stepped or lap-straked or uniformly shingled surface while at the same time eliminating the need for substantial structural modification or jury-rigged arrangements. In general this is achieved by means of a mounting pedestal having a faceplate portion which provides a flat mounting surface, and a peripheral skirt portion of greater depth than the steps in the siding and having a facing edge along one axis which is stepped to conform precisely to the siding when placed in flush contact therewith.

In the preferred form the device of the invention is provided with an aperture or opening in the faceplate portion and is conveniently mounted on the previously mounted electrical outlet box by means of a conventional strap and screw arrangement. The lamp may thereafter be conveniently mounted on the faceplate of the pedestal and electrical service may be brought to the lamp through the aperture or opening in the faceplate.

According to another aspect of the invention a method is provided for mounting planar-based exterior lamp and ornaments on overlapped and/or lap-straked siding comprising, in general, the steps of mounting an electrical outlet box on the interior side of the siding and, either prior to the mounting of the box or after the mounting of the box, producing an opening in the siding. Thereafter a mounting pedestal having a surface which is configured to match the siding is placed over the aperture and over the box and is secured to the box by means of a screw and strap arrangement or the like. Thereafter the lamp or ornament base is mounted on the pedestal, typically by means of a threaded stud which is secured to the aforementioned strap.

DETAILED DESCRIPTION OF THE SPECIFIC EMBODIMENT

Figure 1:
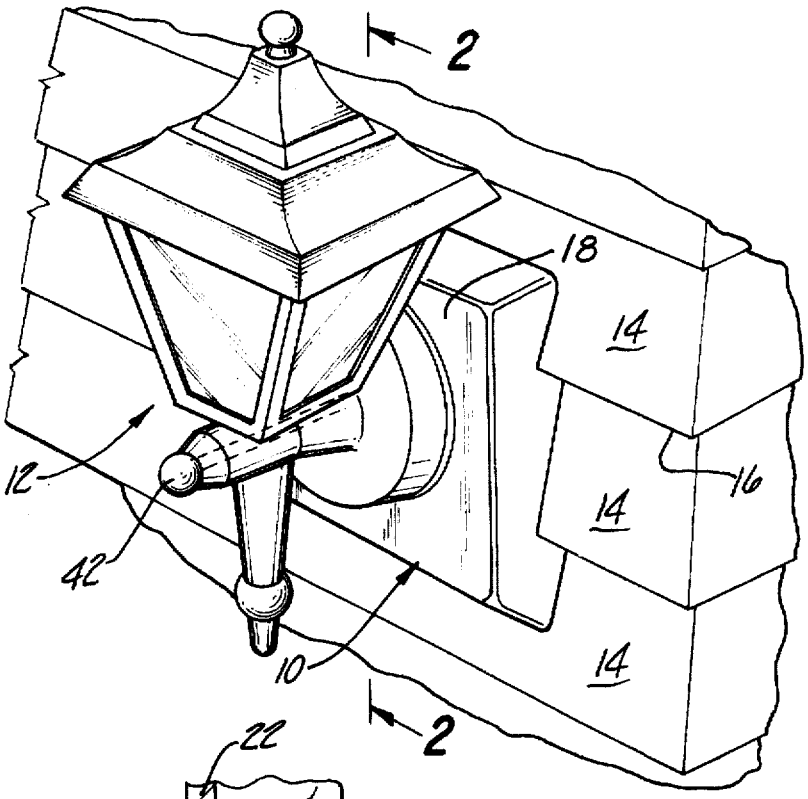
FIG. 1 is a perspective view of a exterior lamp mounted on an aluminum-sided building by means of a pedestal device embodying the invention.

Referring now *to* the drawing a pedestal 10 is provided for mounting a lamp 12, such as a coach lamp, on the exterior surface of a building which is finished in horizontally stepped aluminum siding characterized by four inch strakes 14 separated by parallel horizontal steps 16 of approximately one-half inch in depth.

In accordance with the invention the pedestal 10 comprises a body which may be cast from fiberglass-reinforced resin or molded from plastic, either pure plastic or reinforced with various fillers such as fiberglass strands and the like. The pedestal 10 comprises the integral combination of a flat faceplate portion 18 and a peripheral skirt 20 which is contiguous with the faceplate portion 18. The vertical dimension of the faceplate portion 18 is greater than the four inch width of the strakes 14 i.e., the distance between adjacent parallel steps 16, and the depth of the skirt portion 20 is substantially greater than the one-half inch depth of the steps 16 as is apparent in FIGS. 1 and 2.

Figure 2:
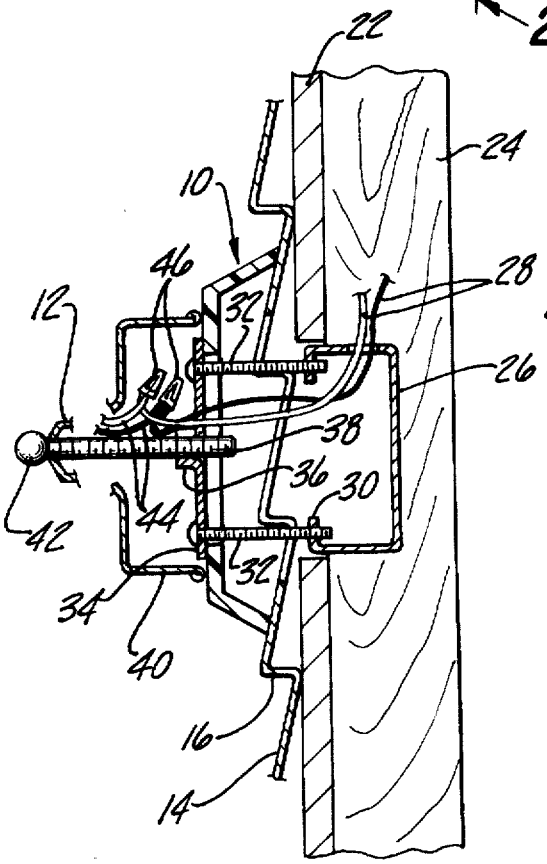
FIG. 2 is a side view, partly in section, of the mounting apparatus of FIG. 1.

As is best shown in the detailed mounting of FIG. 2, the siding 14, 16 is appropriately secured to insulating board 22 which in turn is secured with nails or other suitable fasteners to vertical 2×4 inch studs 24 which make up the exterior walls of the building structure. The siding shown in FIG. 2 is of the type having two strakes 14 per sheet; i.e., every other step 16 is a "false" step formed by a process such as rolling.

Conventional electrical outlet box 26 is appropriately secured by an electrician to a stud 24 at a location which is previously identified to [corresponding] *correspond* with the preferred exterior location of the coach lamp 12. Electrical service wires 28 are brought into the box in the usual fashion. The box 26 is provided with conventional ears or tabs 30 which have threaded holes in them to receive screws 32 which are used to secure a strap 34 over the faceplate portion 18 of the pedestal 10.

It will be noted that the edges 48 and 50 of the skirt portion 20 of pedestal 10 are configured in a stepped arrangement to correspond substantially identically with the step-and-strake configuration of the siding when in flush contact therewith while, on the other hand, edges 52 and 54 are unbroken to lie along respective strakes. Edges 52 and 54 are angled slightly from the plane of the faceplate 18 to compensate for the siding strake angle. The pedestal 10 thus overlies the box 26 and the hole which is cut into the insulation board 22 to accommodate the box 26.

Strap 34 has a raised collar flange 36 which is provided with a threaded aperture to receive a conventional hollow threaded lamp mounting stud 38 therein. The base 40 of coach lamp 12 is provided with a mounting aperture and is placed over the stud 38 and secured in place by means of a cap nut 42. The preinstalled lamp wires 44 are joined with the electrical service wires 28 within the area of the box by means of conventional connectors 46.

Figure 3:
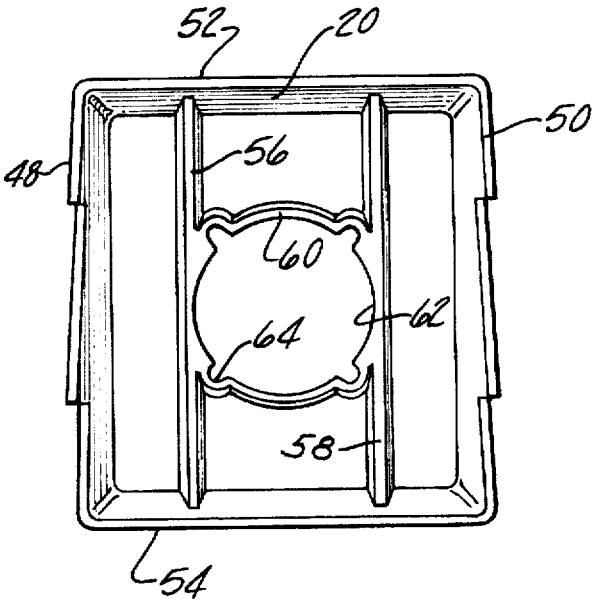
FIG. 3 is a rear plan view of the mounting pedestal in the arrangements of FIGS. 1 and 2.

Looking again to FIG. 3 it can be seen that the interior of the pedestal 10 is provided with a pair of rigidifying ribs 56 and 58 which extend between opposite runs of the skirt 20 and which are integral with the skirt 20 as well as with the interior surface of the face plate 18. In the preferred form a rigidifying ring or collar 60 is provided around the aperture 62 in the pedestal 10 and two sets of diametrically opposite enlargement ears 64 are formed in the aperture 62 to provide clearance for the mounting screws 32 previously described.

Although the pedestal 10 is illustrated as rectangular or square, it may of course be formed in any desired and suitable configuration such as eliptical or oblong and it may be manufactured from a variety of materials and in a variety of shapes to conform to different sizes and types of wood, aluminum or other metal sidings. The four inch siding with the one-half inch step has been cited merely by way of example.

The steps in the preferred installation of the pedestal 10 and lamp 12 are hereinafter described.

First, it is necessary to locate the position on the exterior of the previously cited building structure where the lamp 12 is desired. The installer places the pedestal in a temporary fashion on the surface of the aluminum siding to insure appropriate fit, acceptable aesthetics and so forth. A small hole is preferably drilled through the insulation board so that it can be viewed from within the unfinished interior of the building structure. This hole defines the preferred location for the electrical outlet box 26. Obviously the hole may be moved from side to side as necessary to allow the box 26 to be secured to the nearest adjacent stud 24.

Next the opening in the insulation board and in the siding itself is made, preferably by means of a hole saw. Thereafter the electrical outlet box 26 may be permanently installed and the electrical service wires 28 brought thereto. The pedestal 10 is again placed over the hole and the screws 32 and strap 34 are secured in place. The pedestal 10 is now held against the siding by means of the screws 32 and strap 34 and the electrical service wires 28 are accessible through the central aperture 62 of the pedestal 10.

The threaded stud 38 is now screwed into position and the connections 46 between the wiring 44 and 28 are made. The base 40 of the lamp is disposed over the exposed end of the stud 38 and the capscrew 42 is applied to finish the installation.

In a deluxe model it may be desirable to provide adhesive along the edges 48 and 50, 52 and 54 of the pedestal 10 so that the pedestal may be temporarily bonded to the siding to facilitate installation. This adhesive might be covered with a tape prior to installation. It may also be desirable to caulk around the pedestal 10 where it lies against the siding to correct for any small gaps which might exist. If desired the edges 48 and 50, 52 and 54 could also be grooved to accept a bead of caulking compound at the time of installation.

Various modifications and additions to the illustrated embodiment [mode] might be made; for example, various styles, swapes, textiles and proportions will be apparent to the skilled artisan. Also, the pedestal may be integrated with the lamp or ornament, taking the place of or integral with element 40 in FIG. 2, for example.

I claim:

1. A pedestal for mounting a lamp on the exterior surface of stepped siding *wherein the siding has an opening exposing an outlet box having a pair of threaded apertures, the pedestal* comprising:

a pedestal body having a front surface which is substantially planar, a rear surface and a depth between said front and rear surfaces which is greater than that of steps forming said siding, the rear surface being configured to define at least two parallel but noncoplanar levels separated by a step having a depth *the* same as that of the steps in said siding to conform with said stepped siding in flush contact therewith;

said body having an aperture extending from the front surface to the rear surface[.];

*a pair of threaded screws having a length greater than the depth of said pedestal body; and*

*a strap having a pair of apertures registrable with said outlet box apertures and adapted to receive said screws, said strap capable of being positioned on said front surface of the pedestal.*

2. An apparatus as defined in claim 1 wherein said pedestal body is a hollow shell and said rear surface is the periphery of said shell.

3. A pedestal for mounting a lamp on an exterior surface of stepped siding *wherein the siding has an opening exposing an outlet box having a pair of threaded apertures, the pedestal* comprising:

a substantially rigid body having a face plate portion adapted to be arranged on said exterior surface with a longitudinal dimension thereof at right angles to and extending across steps forming said stepped siding, and a continuous skirt portion terminating in a rearward facing edge and having a finite depth and being peripherally contiguous with said face plate portion;

the longitudinal dimension of said body being greater than a distance between adjacent steps in said stepped siding and the depth of said skirt portion being greater than that of the siding step;

the edge of said skirt portion along said longitudinal dimension being stepped [configured] to conform with said stepped siding in flush contact therewith[.];

*a pair of threaded screws having a length greater than the depth of said skirt; and*

*a strap having a pair of apertures registrable with said outlet box apertures and adapted to receive said screws, said strap capable of being positioned on said face plate portion of the pedestal.*

4. Apparatus as defined in claim 3 wherein said body is essentially rectangular.

5. Apparatus as defined in claim 3 wherein said body is manufactured of molded plastic.

[6. Apparatus as defined in claim 1 including an electric outlet box in alignment with said pedestal providing electric service to said lamp; and means for mounting said pedestal to said outlet box.]

7. Apparatus as defined in claim 3 including an aperture in said faceplate portion to provide access to electrical service for said lamp.

8. Apparatus as defined in claim 7 including rigidifying ribs extending between and integral with opposite extremities of said skirt portion and integrally contiguous with an interior surface of said faceplate portion.

9. Apparatus as defined in claim 7 further including a rigidifying rib extending peripherally around said aperture and contiguous with an interior surface of said faceplate portion.

10. Apparatus as defined in claim 7 wherein said aperture is essentially round and further including at least one set of diametrically opposite enlargement ears in said aperture.

*11. A pedestal for mounting a lamp on the exterior surface of stepped siding comprising:*

*a pedestal body having a front surface which is substantially planar, a rear surface and a depth between said front and rear surfaces which is greater than that of steps forming said siding, the rear surface being configured to define at least two parallel but noncoplanar levels separated by a step having a depth the same as that of the steps in said siding to conform with said stepped siding in flush contact therewith;*

*said body having an aperture extending from the front surface to the rear surface, said aperture having a pair of diametrically opposite enlargement ears.*

*12. An apparatus as defined in claim 11 wherein said pedestal body is a hollow shell and said rear surface is the periphery of said shell.*

*13. Apparatus as defined in claim 1 wherein said strap apertures are threaded to operatively engage said screws.*

*14. Apparatus as defined in claim 3 wherein said strap apertures are threaded to operatively engage said screws.*

* * * * *